United States Patent [19]

Kumakura et al.

[11] Patent Number: 4,791,501
[45] Date of Patent: Dec. 13, 1988

[54] MAGNETIC HEAD SUPPORT APPARATUS FOR A TWO-SIDED FLOPPY DISK DRIVE

[75] Inventors: Takeshi Kumakura; Toshikazu Hayashi; Kazuo Koike, all of Koriyama, Japan

[73] Assignee: Mitsubishi Denki Kabushiki Kaisha, Japan

[21] Appl. No.: 879,955

[22] Filed: Jun. 30, 1986

[30] Foreign Application Priority Data

Jul. 3, 1985 [JP] Japan ................................ 60-144607
Jul. 3, 1985 [JP] Japan ................................ 60-144609

[51] Int. Cl.4 ........................... G11B 5/54; G11B 21/16
[52] U.S. Cl. ................................. 360/105; 360/104
[58] Field of Search ............... 360/102, 103, 104, 105, 360/97, 99

[56] References Cited

U.S. PATENT DOCUMENTS

| | | | |
|---|---|---|---|
| 4,089,029 | 5/1978 | Castrodale et al. | 360/105 |
| 4,379,316 | 4/1983 | Krane | 360/105 |
| 4,432,027 | 2/1984 | Higuchi | 360/104 |
| 4,611,257 | 9/1986 | Shiroyama et al. | 360/99 |
| 4,651,245 | 3/1987 | Kanno | 360/104 |
| 4,658,315 | 4/1987 | Seki et al. | 360/104 |
| 4,709,286 | 11/1987 | Koike | 360/99 |
| 4,710,833 | 12/1987 | Hasegawa | 360/106 |

FOREIGN PATENT DOCUMENTS 067346 12/1982 European Pat. Off. .
8101071 4/1981 PCT Int'l Appl. .
2051457 1/1981 United Kingdom .

Primary Examiner—John H. Wolff
Assistant Examiner—Matthew J. Bussan
Attorney, Agent, or Firm—Leydig, Voit & Mayer

[57] ABSTRACT

A support apparatus for the magnetic heads of a two-sided floppy disk drive has a first magnetic head which is elastically supported on the front portion of a carriage so as to be able to move in the normal direction of a floppy disk, and a second magnetic head which is supported by the front portion of a rotating arm. The rotation of the arm towards the floppy disk is restrained by an arm support. In a first embodiment, the first magnetic head is supported by a first gimbal spring which is secured to the carriage, and the second magnetic head is secured to a steel plate which is secured to the arm. In a second embodiment, the second magnetic head is supported by a second gimbal spring which is secured to the arm which has a greater stiffness than the first gimbal spring.

4 Claims, 4 Drawing Sheets

MAGNETIC HEAD SUPPORT APPARATUS FOR A TWO-SIDED FLOPPY DISK DRIVE

BACKGROUND OF THE INVENTION

The present invention relates to an apparatus for supporting the magnetic heads in a two-sided floppy disk drive.

In a conventional support apparatus for the magnetic heads of a two-sided floppy disk drive, a first head is usually secured to a movable carriage and prevented from moving towards or away from the surface of the disk, while the second magnetic head is mounted on a rotatable arm to permit the second head to be moved towards or away from the surface of the disk. A conventonal magnetic read support apparatus of this type is illustrated in FIG. 1. A pair of read/write magnetic heads 4 and 5 are supported on a carriage 1 movable along an unillustrated guide rail in the radial direction with respect to a floppy disk 2. A first magnetic read/write head 4 is bonded to a base 3 rigidly secured to a front end of the carriage 1. A second magnetic read/write head 5 is positioned on the opposite side of the disk 2 so facing the first magnetic head 4 and is supported by the front portion of a rotatable arm 6. The arm 6 is supported by the rear portion of the carriage 1 through a flat spring 8, one end of which is secured to the rear portion of the arm 6 by insertion molding or other applicable means, and the other end of which is secured to the rear portion of the carriage 1 by a screw 15. The arm 6 has an tapered extension 6b which extends downwards towards the back surface of the secon magnetic head 5. The lower end of the tapered extension 6b contacts the back surface and acts as a pivot for the rotation of the second magnetic head 5. The second magnetic head 5 is bonded to the center of a gimbal spring 7 whose ends are secured to the front portion of the arm 6. A counterclockwise biasing force is applied to the arm 6 by a torsion spring 9 mounted on a subframe 10 and secured to the carriage 1 by the screw 15. The arm 6 has an L-shaped lever 6a formed on its top surface which engages with the bail 11 of an unillustrated solenoid.

In FIG. 1, the floppy disk 2 is shown mounted on a spindle 12 which rotates the disk 2. The disk 2 is held against the spindle 12 by a cap unit 13 which rotates with the spindle 12. The cap unit 13 has a shaft 14 projecting from its upper surface by which the cap unit 13 can be raised and lowered in the axial direction of the shaft 14. The spindle 12 has a cylindrical cavity 12a formed in its center into which the cap unit 13 is inserted, thereby clamping the disk 2 between the cap unit 13 and the spindle 12.

The force exerted on the disk 2 by the cap unit 13 when the disk 2 is held between the spindle 12 and the cap unit 13 produces wrinkles in the surface of the disk 2. While the spindle 12 is usually made of a metal such as aluminum or brass, the cap unit 13 is made of a softer material such as zircon or a polycarbonate. As a result, the wrinkles in the disk 2 are formed mainly in the top surface of the disk 2 which contacts the cap unit 13, as shown in FIG. 1. When the wrinkles pass between the magnetic heads, the second magnetic head 5 is vibrated up and down as it follows the surface of the disk 2.

When the slopes of the wrinkles in the surface of the disk 2 are gradual, the accelerations of the second magnetic head 5 in the direction normal to the surfaceof the disk 2 are small, and the second magnetic head 5 is able to follow the undulating surface of the disk 2. However, if the slopes of the wrinkles are steep, the second magnetic head 5 undergoes large accelerations in the normal direction, and the force required to keep it in contact with the surface of the disk 2 increases. However, the torsional spring 9 is designed to apply a constant force on the second magnetic head 5 of generally no more than 20 grams, which is insufficient when the second magnetic head 5 undergoes large accelerations. As a result, the second magnetic head 5 may be bounced away from the surface of the disk 2 by the accelerations.

Accordingly, the conventional apparatus illustrated in FIG. 1 has the problem that stable contact between the magnetic heads and the disk 2 can not be maintained, and the ability of the magnetic heads to read and write information is therefore decreased. Although the force applied on the second magnetic head 5 by the torsion spring 9 can be increased to prevent the second magnetic head 5 from bouncing off, this increases the wear on the disk 2 by the magnetic heads and reduces the lifespan of the disk 2.

Generally, the head core of the second magnetic head 5 is located closer to the radial center of the disk 2 than is the head core of the first magnetic head 4. As a result, the recording density of the disk 2 on the side facing the second manetic head 5 is higher than on the opposte side. However, since wrinkles are mainly formed on the side facing the second magnetic head 5, this side often has a higher error rate compared to the side facing the first magnetic head 4. Therefore, it is necessary to achieve stable contact between the disk 2 and the second magnetic head 5 to improve performance.

Another problem with the conventional apparatus illustrated in FIG. 1 is that the disk 2 can be damaged due to the so-called "tapping" taking place when the arm 6 which supports the second magnetic head 5 is raised or lowered. When the arm 6 is lowered by the force of the torsion spring 9, the second magnetic head 5 tends to collide with the disk 2. In addition, when the arm 6 is raised by an unillustrated solenoid to cause the second magnetic head 5 to separate from the disk 2, due to the gimbal spring 7 which supports the second magnetic head 5 having a small spring constant, the second magnetic head 5 may strike against the disk 2. In either case, the impact between the second magnetic head 5 and the disk 2 can damage the disk 2 and reduce its lifespan.

SUMMARY OF THE INVENTION

It is an object of the present invention to overcome the above-described problems and to provide a support apparatus for the magnetic heads of a two-sided floppy disk drive in which stable contact between the magnetic heads and the floppy disk can be achieved at all times.

It is another object of the present invention to provide a support apparatus for magnetic head in which the impact imparted to a floppy disk when tapping takes place is significantly reduced.

In the present invention, a first magnetic head is elastically supported by the front portion of a carriage with a first gimbal spring which enables the first magnetic head to move in the directions normal to the surface of a floppy disk when force is applied to it. A second magnetic head is supported on an arm with a support which is stiffer than the elastic support on the first magnetic head. The rotation of the arm towards the disk is restrained by an arm support which is secured to the carriage so that the force pressing the magnetic heads towards the disk is less than the force applied by a torsion spring which rotates the arm towards the disk.

In a first embodiment, the second magnetic head is supported by a steel plate which is secured to the arm. In a second embodiment, the second magnetic head is supported by a second gimbal spring which is secured to the arm and which has a greater stiffness than the first gimbal spring which supports the first magnetic head.

BRIEF DESCRIPTION OF THE DRAWINGS

In the figures, the same reference numerals indicate the same or corresponding parts.

DESCRIPTION OF THE PREFERRED EMBODIMENTS

Figure 2:
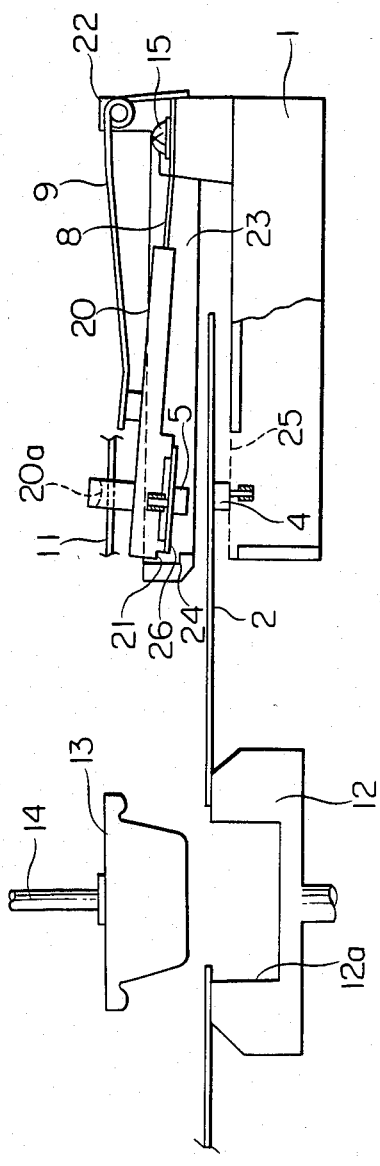
FIG. 2 is a partially cross-sectional side view of a first embodiment of a support apparatus according to the present invention, showing the magnetic heads in an open position.
Figure 3:
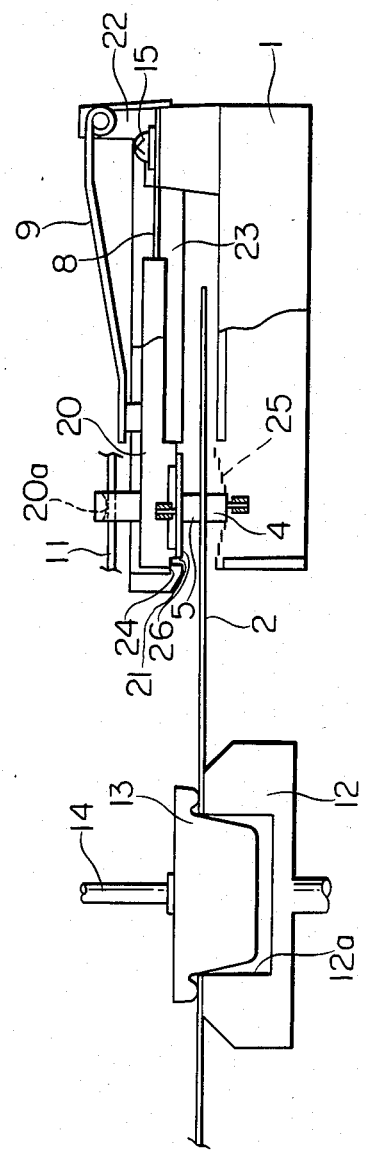
FIG. 3 is another partially cross-sectional side of the embodiment of FIG. 1, showing the state in which a floppy disk is mounted on the disk drive and the magnetic heads are in the read/write position.

A number of preferred embodiments of the present invention will now be described while referring to FIGS. 2 through 7 of the accompanying drawings, of which FIGS. 2 and 3 are partially cross-sectional side views of a first embodiment.

Figure 1:
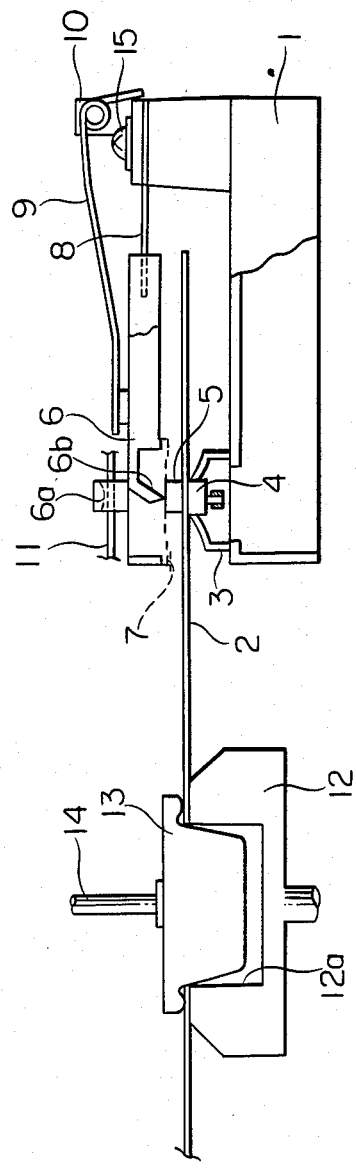
FIG. 1 is a partially cross-sectional side view of a conventional support apparatus for the magnetic heads of a two-sided floppy disk drive, showing the state in which a floppy disk is mounted on the drive and the magnetic heads are in the read/write position.

As in the conventional apparatus of FIG. 1, in a support apparatus according to the first embodiment, a carriage 1 is supported by an unillustrated guide rail so as to be able to translate in the radial direction of a floppy disk 2. The carriage 1 supports an arm 20 which is secured to the rear portion of the carriage 1 in the manner previously described. A sub-frame 22 which is secured to the rear portion of the carriage 1 has a torsion spring 9 mounted thereon, the torsion spring 9 exerting a counterclockwise torque on the arm 20 so as to cause the arm 20 to rotate towards the carriage 1. Unlike the sub-frame 10 of the apparatus of FIG. 2, this sub-frame 22 has a rigid arm support 23 which extends towards the front of the carriage 1 and towards the radial center of the floppy disk 2. A ledge 24 is formed in the arm support 22 near its front end, and the arm 20 has a rectangular recess 21 formed in its front end. The length of the arm support 23 is chosen such that when the arm 20 is rotated towards the disk 2, the top surface of the recess 21 will abut against the top surface of the ledge 24, thereby supporting the arm 20 and preventing its further rotation towards the disk 2. An L-shaped lever 20a which engages with the bail 11 of an unillustrated solenoid is formed on the top surface of the arm 20, as shown in FIG. 2.

A first magnetic head 4 is supported by the front portion of the carriage 1 through a first elastic support member, which in this case is a first gimbal spring 25 whose ends are secured to the carriage 1. The first magnetic head 4 is bonded to the center of the first gimbal spring 25. The first gimbal spring 25 enables the first magnetic head 4 to move in the direction normal to the surface of the disk 2 and enables it to rotate about the center of the first gimbal spring 25 with two degrees of freedom.

A second magnetic head 5 is bonded to the center of a steel plate 26 which is rigidly secured to the end of the arm 20. It is also possible, however, for the second magnetic head 5 to be directly bonded to the arm 20 without the use of a steel plate 26.

FIG. 3 illustrates the position of the magnetic heads when they are in the read/write position. In this state, the arm 20 is rotated towards the disk 2 by the torsion spring 9 until the recess 21 in the arm 20 abuts against the ledge 24 in the arm support 23. The second magnetic head 5 is pushed towards the disk 2 by the arm 20, and this pressing force is reacted by the first gimbal spring 25 on the other side of the disk 2, the first gimbal spring 25 deforming in the direction away from the surface of the disk 2. In this situation, the torsion spring 9 exerts a torque on the arm 20 equivalent to a force of about 40 grams acting on the arm 20 at a point above the second magnetic head 5. However, this torque is largely reacted by the arm support 23, and the actual force with which the second magnetic head 5 is pressed towards the disk 2 is equal to the force which the first gimbal spring 25 exerts on the first magnetic head 4 as it deforms away from the disk 2. During normal operation, this force is most about 20 grams. However, when wrinkles in the surface of the disk 2 produce undulations of the disk 2, the deformation of the first gimbal spring 25 will increase, and the force acting on the second magnetic head 5 will increase as it receives the increased force exerted through the first magnetic head 4. Thus, the force with which the first and second magnetic heads are pressed towards the disk 2 is automatically adjusted by the deformation of the first gimbal spring 25. Since the torsion spring 9 pushes the arm 20 against the arm support 23 with a torque equivalent to a force of 40 grams exerted at a point above the second magnetic head 5, the second magnetic head 5 can undergo an acceleration producing a force on it of up to 40 grams without being bounced off the disk 2.

Since the torsion spring 9 is prevented from exerting its full force on the second magnetic head 5 by the support arm 20, the maximum force which can be exerted on the secon magnetic head 5 can be increased while maintaining the force which is normally exted on it at a low level of at most 20 grams. Accordingly, the present invention, the second magnetic head 5 can be prevented from bouncing off the disk 2 due to high accelerations without increasing the wear on the disk 2.

In the present embodiment, the second magnetic head 5 is secured in the arm 20 by a stiff, steel plate 26 instead of a flexible gimbal spring 7 as in the conventional apparatus of FIG. 1. By imparting greater stiffness to the support for the second magnetic head 5, the impact produced by tapping when the arm 20 is rotated upwards to the open position can be decreased.

Figure 4:
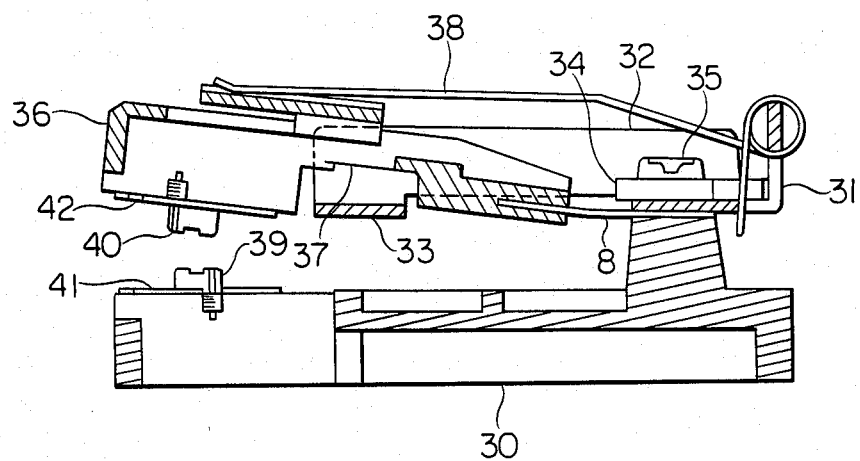
FIG. 4 is a partially cross-sectional side view of a second embodiment of the present invention, showing the magnetic heads in the open position.
Figure 5:
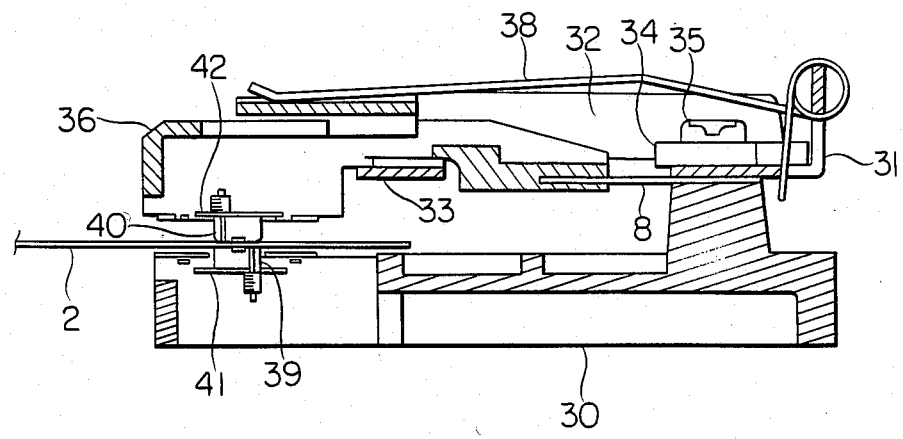
FIG. 5 is a partially-cross-sectional side view of the embodiment of FIG. 4, showing the state in which a floppy disk is mounted on the drive and the magnetic heads are in the read/write position.
Figure 6:
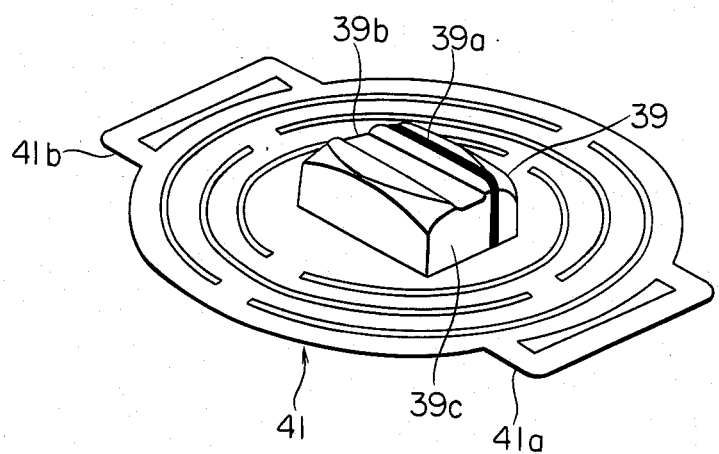
FIG. 6 is a perspective view of the first magnetic head of FIG. 4, showing it mounted on a first gimbal spring.
Figure 7:
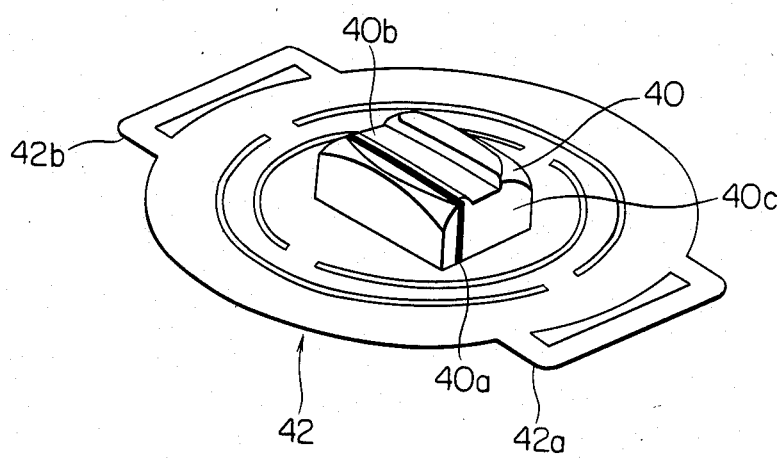
FIG. 7 is a perspective view of the second magnetic head of FIG. 4, showing it mounted on a gimbal spring having a higher stiffness than the first gimbal spring for the first magnetic head.

FIGS. 5 through 7 illustrate a second embodiment of the present invention. In contrast to the first embodiment, in the second embodiment, an arm support 32 which is formed on a sub-frame 31 extends only to the intermediate porton of arm 36, and a recess 37 formed in the intermediate portion of the arm 36 abuts against a ledge 33 formed on the front end of the arm support 32 when the arm 36 is rotated counterclockwise in the figure. In this embodiment, the sub-frame 31 is secured to a carriage 30 by a screw 35 together with a retaining plate 34. The arm support 32 in this embodiment serves the same purpose as the arm support 22 in the first embodiment and limits the rotation of the arm 36 towards a disk 2. For the sake of simplicity, the L-shaped lever, the bail of the solenoid, the spindle, and the cap unit have been omitted from FIGS. 4 and 5.

As in the first embodiment, a first magnetic head 39 is supported by the front portion of a carriage 30 with a first gimbal spring to the center of which it is bonded. However, instead of being secured to the arm 36 by a steel plate, a second magnetic head 40 is elastically supported by the front portion of the arm 36 with a second elastic support member in the form of a second gimbal spring 42. The end portions of the second gimbal spring 42 are secured to the arm 36, and the second magnetic head 40 is bonded to the center of the second gimbal spring 42. Like the first gimbal spring 41, the second gimbal spring 42 enables the second magnetic head 40 to move in the direction normal to the surface of the disk 2 and enables it ot rotate with two degrees of freedom. The second gimbal spring 42 has a greater stiffness in each direction of movement or rotation than does the first gimbal spring 41.

FIGS. 6 and 7 are perspective views showing examples of the first and second gimbal springs, respectively. The first gimbal spring 41 has a triple-ring construction and the first magnetic head 39 is bonded to its center. The first magnetic head 39 has a ceramic base 39c which contains a read/write core 39a which is displaced to one side of a flotation-preventing groove 39b which is formed in the center of the head 39. The top surface of the head 39 is flat, but the corners are rounded off and smoothly connect with the top surface so as not to damage the surface of the disk 2. The first gimbal spring 41 has diametrically opposed end portions 41a and 41b which are secured to the carriage 30.

The second gimbal spring 42 is similar to the first gimbal spring 41, but it has a double instead of a triple-ring construction, as a result of which it has reater stiffness in each direction of movement than does the first gimbal spring 41. The second magnetic head 40 which is bonded to the center of the second gimbal spring 42 has a ceramic base 40c and a read/write core 40a which is disposed to one side of a flotation-preventing groove 40b formed in the center of the head 40. The second gimbal spring 42 is secured to the arm 36 by diametrically opposed end portions 42a and 42b formed thereon. The magnetic heads 39 and 40 are mounted on the carriage 30 and the arm 36 such that the two magnetic heads confront one another with the read/write core 39a of the first magnetic head 39 being disposed farther from the radial center of the disk 2 than the read/write core 40a of the second magnetic head 40.

In this embodiment, the first and second gimbal springs are given different stiffness by using a triple-ring structure for the first and a double ring-structure for the second. However, it is also possible to use gimbal springs having the identical shape and to impart a difference in stiffness by using a smaller thickness for the first gimbals spring 41 than for the second, or by using a more flexible material for the first gimbal spring 41 than for the second.

FIG. 4 shows the arm 36 in the open position in which the arm 36 is rotated clockwise in the figure by the force of the unillustrated solenoid. When the solenoid is retracted, the force of a torsion spring 38 on the arm 36 causes it to rotate until the magnetic heads are in the read/write position illustrated in FIG. 5 in which the arm 36 is pressed against the ledge 33 of the arm support 32. In this state, the torsion spring 38 exerts a torque on th arm 36 equivalent to a force of 40 grams exerted on the arm 36 at a point above the second magnetic head 40. However, because of the arm support 32 which restrains the rotation of the arm 36, the force actually exerted on the disk 2 by the second magnetic head 40 is much less and is determined by the deformation of the first and second gimbal springs in the directions normal to the surface of the disk 2. During normal operation, the forces exerted on the magnetic heads is generally around 12 grams. However, when undulations in the disk surface increase the forces acting to push the the magnetic heads away from the disk 2, the deformation of the gimbal springs increases to automatically increase the force pushing the magnetic heads against the disk 2 so as to maintain stable contact, and a force of up to 40 grams can be exerted on the heads without the second magnetic head 40 being bounced off the disk 2.

Due to the different stiffnesses of the first and second gimbal springs, the movement of the first and second magnetic heads differs depending on the frequency of the accelerations produced by undulations of the disk 2. When the undulations are large and gradual and the accelerations are comparatively small and low in frequency, the second magnetic head 40 remains almost stationary due to the larger stiffness of the second gimbal spring 42, and the first magnetic head 39 performs small up and down movement to follow the undulations. On the other hand, when the undulations of the surface of the disk 2 are small and steep, the first magnetic head 39 remains almost stationary while the second magnetic head 40 performs minute up and down movement and rotation to follow the undulating surface of the disk 2. Thus, regardless of the nature of the undulations in the disk surface produced by wrinkles, the magnetic heads are able to adequately follow the disk surface.

When the arm 36 is rotated from the open position illustrated in FIG. 4 to the read/write position in FIG. 5, tapping may occur. However, because the arm support 32 prevents the full force of the torsion spring 38 from being applied to the disk 2, the impact of the second magnetic head 40 against the disk 2 is reduced, and because the first and second gimbal springs can deform in the direction normal to the surface of the disk 2, the impact applied to the disk 2 by the magnetic heads is further reduced. Furthermore, because the second gimbal spring 42 is stiffer than the gimbal spring 7 used to support the second magnetic head 5 in the conventional apparatus of FIG. 1, the impact applied to the disk 2 by the second magnetic head 40 during tapping when the arm 36 is rotated upwards is also reduced.

In both of the embodiments described above, the arm support for restraining the rotation of the arm is formed on a sub-frame. However, it is not necessary that it be a part of a sub-frame, and it can be secured to any portion of the carriage in which it will not interfere with the insertion and removal of the disk 2.

What is claimed is:

1. A support apparatus which maintains contact of first and second magnetic heads of a disk drive with a two-sided floppy disk having undulations in its planar surface, said apparatus comprising:

a carriage having front and rear portions and movable in a radial direction with respect to said two-sided floppy disk;

an arm rotatably supported by said rear portion of said carriage for rotating between a first position in which a front portion of said arm is remote from said first portion of said carriage and a second position in which said front portion of said arm is in the vicinity of said front portion of said carriage;

an arm support means for engaging a portion of said arm when said arm is in said second position, thereby preventing rotation of said arm past said second position;

means for applying a torque to said arm in order to bias said arm in said second position and against said arm support means;

a first magnetic head supported by said carriage in said front portion thereof;

a second magnetic head supported by said rotating arm at said front portion thereof and facing said first magnetic head when said arm is in said second position;

means for supporting said first and second magnetic heads on said carriage and arm, respectively, so as to enable said first and second magnetic heads to move in a direction normal to said planar surface of said two-sided floppy disk in response to said undulations in order that said first and second magnetic heads maintain continuous contact with the surface of said two-sided floppy disk; and said means for supporting said first and second magnetic heads including a first means for supporting said first magnetic head having a lesser stiffness than a second means for supporting said second magnetic head.

2. A support apparatus as claimed in claim 1 wherein said first means for supporting said first magnetic head includes a first gimbal spring secured to said carriage and said first magnetic head is bonded to the center of said first gimbal spring.

3. A support apparatus as claimed in claim 2 wherein said second means for supporting said second magnetic head includes a rigid body secured to the front portion of said arm and said second magnetic head is bonded to the center of said rigid body so as to confront said first magnetic head when said arm is in the second position.

4. A support apparatus as claimed in claim 2 wherein said second means for supporting said second magnetic head includes a second gimbal spring secured to the front portion of said arm and having a greater stiffness than said first gimbal spring, said second magnetic head being bonded to the center of said second gimbal spring so as to face said first magnetic head.

* * * * *